US011113853B2

(12) United States Patent
Papp et al.

(10) Patent No.: US 11,113,853 B2
(45) Date of Patent: Sep. 7, 2021

(54) SYSTEMS AND METHODS FOR BLENDING AND AGGREGATING MULTIPLE RELATED DATASETS AND RAPIDLY GENERATING A USER-DIRECTED SERIES OF INTERACTIVE 3D VISUALIZATIONS

(71) Applicant: Aqumin, LLC, Houston, TX (US)

(72) Inventors: Denis R. Papp, Richmond, TX (US); Michael J. Zeitlin, Houston, TX (US)

(73) Assignee: AQUMIN, LLC, Houston, TX (US)

( * ) Notice: Subject to any disclaimer, the term of this patent is extended or adjusted under 35 U.S.C. 154(b) by 0 days.

(21) Appl. No.: 15/734,169

(22) PCT Filed: May 29, 2020

(86) PCT No.: PCT/US2020/035091
§ 371 (c)(1),
(2) Date: Dec. 1, 2020

(87) PCT Pub. No.: WO2020/243409
PCT Pub. Date: Dec. 3, 2020

(65) Prior Publication Data
US 2021/0248792 A1 Aug. 12, 2021

Related U.S. Application Data

(60) Provisional application No. 62/854,180, filed on May 29, 2019.

(51) Int. Cl.
*G06T 11/20* (2006.01)
*G06T 15/20* (2011.01)
*G06F 16/28* (2019.01)
*G06F 16/2455* (2019.01)
*G06F 16/901* (2019.01)

(52) U.S. Cl.
CPC ...... *G06T 11/206* (2013.01); *G06F 16/24556* (2019.01); *G06F 16/287* (2019.01); *G06F 16/9024* (2019.01); *G06T 15/205* (2013.01)

(58) Field of Classification Search
CPC ... G06T 11/206; G06T 15/205; G06F 16/287; G06F 16/24556; G06F 16/9024
See application file for complete search history.

(56) References Cited

U.S. PATENT DOCUMENTS

| | | |
|---|---|---|
| 7,805,460 B2 | 9/2010 | Artan et al. |
| 8,286,100 B2 | 10/2012 | Helfman et al. |
| 8,910,084 B2 | 12/2014 | Helfman et al. |
| 8,963,916 B2 | 2/2015 | Reitan |
| 9,454,291 B2 | 9/2016 | Helfman et al. |

(Continued)

OTHER PUBLICATIONS

Copenheaver, Blaine R., International Search Report and Written Opinion for PCT App. No. PCT/US20/35091, dated Jul. 30, 2020, 13 pages, USPTO, Alexandria, VA.

*Primary Examiner* — Sarah Lhymn
(74) *Attorney, Agent, or Firm* — Crain, Caton and James

(57) ABSTRACT

Systems and methods that enable blending and aggregating multiple related datasets to a blended data model (BDM), manipulation of the resulting data model, and the representation of multiple parameters in a single visualization. The BDM and each visualization can be iteratively manipulated, in real-time, using a user-directed question-answer-question response so patterns can be revealed that are not obvious.

17 Claims, 15 Drawing Sheets

(56) References Cited

U.S. PATENT DOCUMENTS

| | | | |
|---|---|---|---|
| 9,477,732 B2 | 10/2016 | Helfman et al. | |
| 2008/0097816 A1 | 4/2008 | Freire et al. | |
| 2009/0013270 A1* | 1/2009 | Helfman | G06F 3/0481 |
| | | | 715/764 |
| 2009/0013271 A1* | 1/2009 | Helfman | G06F 16/26 |
| | | | 715/764 |
| 2009/0013287 A1* | 1/2009 | Helfman | G06F 3/048 |
| | | | 715/853 |
| 2009/0063557 A1* | 3/2009 | MacPherson | G06N 5/02 |
| 2011/0179051 A1* | 7/2011 | Bruckner | G06F 16/248 |
| | | | 707/758 |
| 2011/0187710 A1 | 8/2011 | Giovinazzi et al. | |
| 2012/0330869 A1 | 12/2012 | Durham | |
| 2016/0049007 A1 | 2/2016 | Mullins et al. | |
| 2016/0260232 A1 | 9/2016 | McGill | |
| 2018/0046355 A1 | 2/2018 | Merdan et al. | |
| 2019/0095491 A1* | 3/2019 | Bhattacharjee | G06F 16/2433 |
| 2019/0294613 A1* | 9/2019 | Sullivan | G06F 16/254 |
| 2020/0004749 A1* | 1/2020 | Slezak | G06F 16/2282 |

\* cited by examiner

Input Dataset 1602

| Id | PId | M2 | M3  | M4 |
|----|-----|----|-----|-----|
| E1 | P1  | 12 | Foo | 12 |
| E2 | P1  | 18 | Foo |    |
| E3 | P2  | 30 | Bar | 18 |
| E4 | P2  | 16 |     |    |
| E5 | P2  |    | Cat | 1  |

Input Dataset 1604

| PId | M5  | M6 |
|-----|-----|-----|
| P1  | Foo | 12 |
| P2  | Bar | 18 |
| P3  | Bif | 1  |

1606

Blenden Data Model

Scope E 1612

| Id | PId | M2 | M3  | M4 | M5  | M6 |
|----|-----|----|-----|-----|-----|-----|
| E1 | P1  | 12 | Foo | 12  | Foo | 12 |
| E2 | P1  | 18 | Foo |     | Foo | 12 |
| E3 | P2  | 30 | Bar | 18  | Bar | 18 |
| E4 | P2  | 16 |     |     | Bar | 18 |
| E5 | P2  |    | Cat | 1   | Bar | 18 |

1608

Scope P 1614

| Id        | PId | M2  | M3        | M4 | M5  | M6 |
|-----------|-----|-----|-----------|-----|-----|-----|
| (various) | P1  | 30  | Foo       | 12  | Foo | 12 |
| (various) | P2  | 46  | (various) | 19  | Bar | 18 |
|           | P3  |     |           |     | Bif | 1  |

SYSTEMS AND METHODS FOR BLENDING AND AGGREGATING MULTIPLE RELATED DATASETS AND RAPIDLY GENERATING A USER-DIRECTED SERIES OF INTERACTIVE 3D VISUALIZATIONS

CROSS-REFERENCE TO RELATED APPLICATIONS

This application is a U.S. National Stage Application of PCT Application Serial No. PCT/US20/35091, filed May 29, 2020, which claims the priority of U.S. Provisional Application No. 62/854,180, filed May 29, 2019, both of which are incorporated herein by reference.

FIELD OF THE DISCLOSURE

The following disclosure generally relates to systems and methods for blending and aggregating multiple related datasets and rapidly generating a user-directed series of interactive three-dimensional (3D) visualizations. More particularly, the systems and methods enable the manipulation of a blended data model (BDM), and the representation of multiple parameters of the BDM in a single visualization, which can be interactively manipulated so patterns can be revealed that are not obvious. Using a user-directed question-answer, each visualization can be iteratively adjusted, in real-time.

BACKGROUND

In many fields of research, data analysis involves the collection of many distinct datasets, which are related to a given problem. For example, in biological research, the following datasets may be collected: i) gene expression data (one or more data records per gene per sample) where each sample represents one or more experimental factors; ii) protein expression data (one or more data records per protein per sample); iii) cell population data (one or more data records per cell type per sample); and iv) sample annotation data (each sample is associated with factors such as a tumor type or treatment).

A user will pose a "question" where the collected datasets contain the "answer". Some questions may only require a single dataset. For example, "What genes have the highest expression value for treatment 1 relative to treatment 2?" Some questions may require a combination of datasets. For example, "What genes have both: a high value for treatment 1 relative to treatment 2, and a high value in the matching protein data for treatment 1 relative to treatment 2?"

The user may use data analysis tools to obtain the answers. Conventional data analysis tools, such as Tableau®, Spotfire®, Prism® or Excel®, may employ statistical methods and provide answers in the form of a report—statistically summarizing the data of interest—or in a chart—visually summarizing the data of interest (or visually summarizing the statistical summary of the data of interest). The chart is generally two-dimensional (2D), though some data analysis tools provide static three-dimensional (3D) charts. However, conventional data analysis tools are generally limited to a single dataset, or multiple datasets with a simple relationship. For example, with biological data, the user can use conventional data analysis tools to analyze a gene expression dataset, or gene expression data and a sample annotation dataset, but not both gene expression and protein expression datasets concurrently.

With multiple datasets of different types, analysis of each dataset is often done independent of the others. For example, with biological data, the user may separately analyze gene expression data and protein expression data. This makes it difficult for the user to look at the multiple datasets as a whole, where patterns or correlations would otherwise be visible. The results of each separate analysis would need to be manually combined by the user using additional tools, and therefore not rapid or interactive There are conventional solutions for specific types of data. For example, Qlucore® is a data analysis tool specifically intended for biological data that analyzes a primary dataset and supports additional datasets to specifically annotate row or column identifiers in the primary dataset (such as associating a sample identifier with a treatment).

Conventional data analysis tools such as Tableau® have limited support for blending of multiple related datasets and aggregating values, if they support the operations at all—as above, the analysis of each dataset is often done independently. Blending or merging uses methods such as a database join, which lose context and do not support complex relationships nor aggregation. Aggregation is limited to pivot tables, which are not flexible, or applying database aggregation functions, which must be done manually for each input column. However, these approaches are not flexible and do not support complex relationships.

The user may also rely on a separate data analysis expert who uses advanced software, such as the R software environment or a SQL® database, to blend and aggregate the datasets and ask specific questions. In these cases, the answer is presented to the user who posed the question as a report or chart. However, the data is reduced (the user only has access to aggregate values and/or a subset of the data), non-interactive (the user cannot select a specific element of the report and easily see all of the original data that comprises that reduced element), and the answers are not rapid or immediate.

Representing data as static visual charts is a conventional data analysis tool, to enable the user to see patterns that are not obvious when looking at data represented using numbers and text. However, traditional charts are generally non-interactive and limited to analyzing a single parameter in relation to one or more factors.

There is a powerful pattern recognition tool in the mind's eye, which can be tapped if data is represented in 3D and moves, has geometry and uses color. Visual representation of rapidly changing configurations of multiple parameters of data enables a user, who is a trained expert in the domain of the data, to discover answers to complex questions and observe patterns not obvious with traditional charts or in any other way.

Complexity of data analysis increases when an answer to a given question leads the user to pose a subsequent question—one that they did not know to pose until seeing the answer to the preceding question. For example, if the first question is "what gene has the highest expression value for treatment 1 relative to treatment 2 and the answer is "gene GEX", then the next question might be, "what cells demonstrate a similar treatment response pattern to the gene expression data for GEX." This iterative question-answer-question process may proceed deep into the data analysis, as the user gains insight into their data and the underlying processes behind the data (in this example, the underlying biological processes).

Advances in data collection for many different subject domains have led to the availability of multiple complex datasets of different types. The conventional solutions described above are time consuming, and do not enable rapid iteration in real-time (on-the-fly) of multiple cycles of question-answer-question. Lack of immediate answers limits the user's ability to fully apply the powerful pattern recognition machine of their mind's eye. Discovering the right questions is a vital part of data analysis. Using the mind's eye to detect patterns revealed in 3D visualizations with subsequent on-the-fly re-configurations is critical to speed up time to make important discoveries of the input datasets.

BRIEF DESCRIPTION OF THE DRAWINGS

The following "Detailed Description of the Illustrative Embodiments" is described with reference to the accompanying drawings, in which like elements are referenced with like reference numbers, and in which:

FIG. 16 is a block diagram illustrating an exemplary Blended Data Model with two Scopes presented as tables of Entities and Metrics and transformed from exemplary Input Datasets.

DETAILED DESCRIPTION OF THE ILLUSTRATIVE EMBODIMENTS

Figure 1:
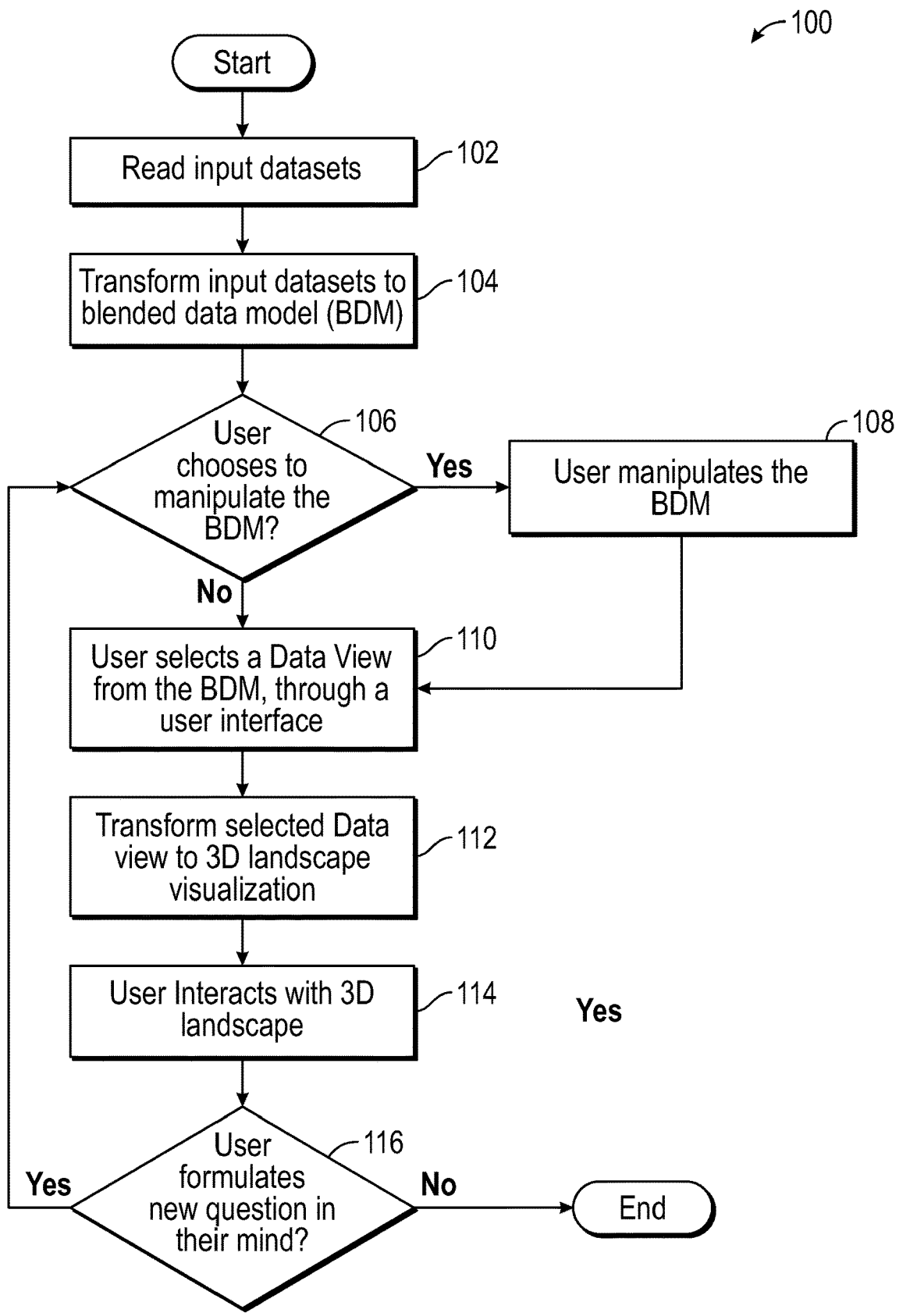
FIG. 1 is a flow diagram illustrating one embodiment of a method for implementing the present disclosure.

The subject matter disclosed herein is described with specificity, however, the description itself is not intended to limit the scope of the disclosure. The subject matter thus, might also be embodied in other ways, to include different structures, steps and/or combinations similar to and/or fewer than those described herein, in conjunction with other present or future technologies. Although the term "step" may be used herein to describe different elements of methods employed, the term should not be interpreted as implying any particular order among or between various steps herein disclosed unless otherwise expressly limited by the description to a particular order. Other features and advantages of the disclosed embodiments will thus, be or become apparent to one of ordinary skill in the art upon examination of the following figures and detailed description. It is intended that all such features and advantages be included within the scope of the disclosed embodiments. Further, the illustrated figures are only exemplary and are not intended to assert or imply any limitation with respect to the environment, architecture, design, or process in which different embodiments may be implemented.

The embodiments disclosed herein overcome prior art disadvantages by blending and aggregating multiple related datasets and representing as a rapidly iterating series of interactive 3D landscape visualizations driven by the user. These 3D landscapes enable the representation of multiple parameters in a single visualization, which can be interactively manipulated so patterns can be revealed that are not obvious. Using a user-directed question-answer-question response, each visualization can be iteratively adjusted, in real-time. Blended data are synergistically presented using color and motion, which provides meaningful context, revealing hidden patterns that otherwise escape detection. Certain patterns that can be observed this way may not be apparent when reviewing reduced data reports or charts that are non-interactive or limited to analysis of a single parameter. The user can pose questions, which require combinations of data to answer, then observe immediate answers by engaging with the 3D landscapes. This enables an on-the-fly iteration of questions, leading to discovery of the right questions in minutes, that would otherwise take months to answer.

In one embodiment, the present disclosure includes a method for blending and aggregating multiple related datasets and rapidly generating a user-directed series of interactive three-dimensional landscape visualizations, comprising: i) transforming multiple related datasets into a blended data model (BDM) using a computer processor; the BDM comprising a plurality of Scopes, a plurality of Metrics and a plurality of Values, wherein each Scope includes a plurality of Entities, and wherein transforming the multiple datasets into the BDM comprises: determining a Target Scope from the plurality of Scopes for each dataset; transforming rows, columns and data values from the multiple datasets to the plurality of Entities, Metrics and Values; determining additional Computed Metrics and Computed Values; determining a Scope Hierarchy; determining Neighbor Entities for each Entity; determining Aggregate Functions for each Metric; and computing Aggregate Values for the plurality of Metrics using the Scope Hierarchy, the additional Computed Metrics, the plurality of Values, the additional Computed Values, the plurality of Entities and the Neighbor Entities; ii) selecting a Data View from the BDM, wherein the Data View is comprised of one or more of the plurality of Entities and one or more of the plurality of Metrics; and iii) transforming the Data View to the three-dimensional landscape visualization.

In another embodiment, the present disclosure includes a non-transitory program carrier device tangibly carrying computer-executable instructions for blend and aggregating multiple related datasets and rapidly generating a user-directed series of interactive three-dimensional landscape visualizations, the instructions being executable to implement: i) transforming the multiple datasets into a blended data model (BDM) comprising a plurality of Scopes, a plurality of Metrics and a plurality of Values, wherein each Scope includes a plurality of Entities; ii) manipulating the BDM by at least one of modifying one or more of the plurality of Metrics that are Computed Metrics; and modifying Aggregate Functions for one or more of the plurality of Metrics; iii) selecting a Data View from the BDM, wherein the Data View includes one or more of the plurality of Entities and a one or more of the plurality of Metrics; iv) transforming the Data View to the three-dimensional landscape visualization, v) interacting with the three-dimensional landscape visualization; vi) formulating a new question based on a display of the three-dimensional landscape visualization; and vii) repeating steps b-d.

Referring now to FIG. 1, a flow diagram illustrates one embodiment of a method 100 for implementing this disclosure. Initially, the user begins with a plurality of related input datasets, and a question in their mind they wish to ask of the data. The method 100 transforms the plurality of related input datasets to a BDM, manipulates the BDM, selects a Data View, transforms the Data View to a 3D landscape visualization, interacts with the 3D landscape visualization, and formulates new questions. The response to the user's actions for manipulating the BDM, selecting a Data View, transforming the Data View to a 3D landscape visualization, and interacting with the 3D landscape visualization are at a rate sufficiently fast that the user perceives a real-time change in the visualization, without perceptible delay or lag. In this manner, the user can ask a question of the input datasets, and quickly observe an answer or pattern. In this manner, the user can also rapidly, easily and effectively cycle through a dynamic series of questions.

Figure 14:
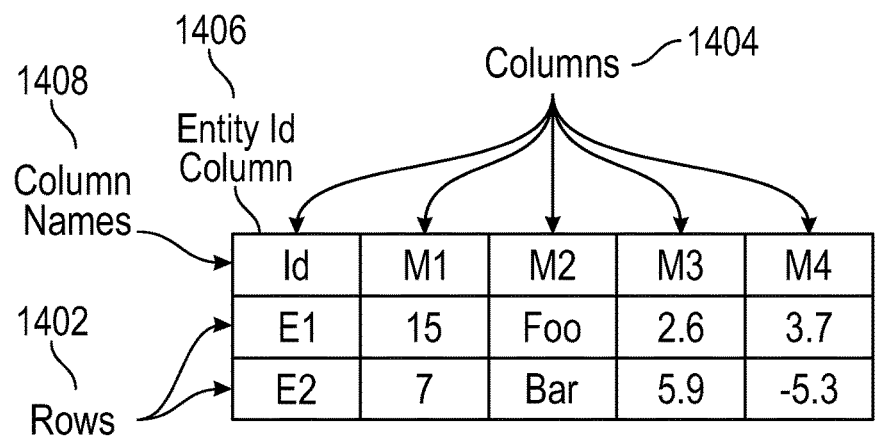
FIG. 14 is a block diagram illustrating an exemplary input dataset, presented as a table of rows and columns.

In step 102, a plurality of related input datasets is read. An exemplary input dataset is illustrated in FIG. 14. An input dataset is comprised of a plurality of rows (1402) and columns (1404), and there is one data value per pair of row and column. Each column has a Column Name (1408) that is unique within the input dataset (for example, "Id", "M1", "M2", "M3", and "M4"). Further, one column is determined as the Entity Id Column 1406 (for example, "Id").

Figure 13:
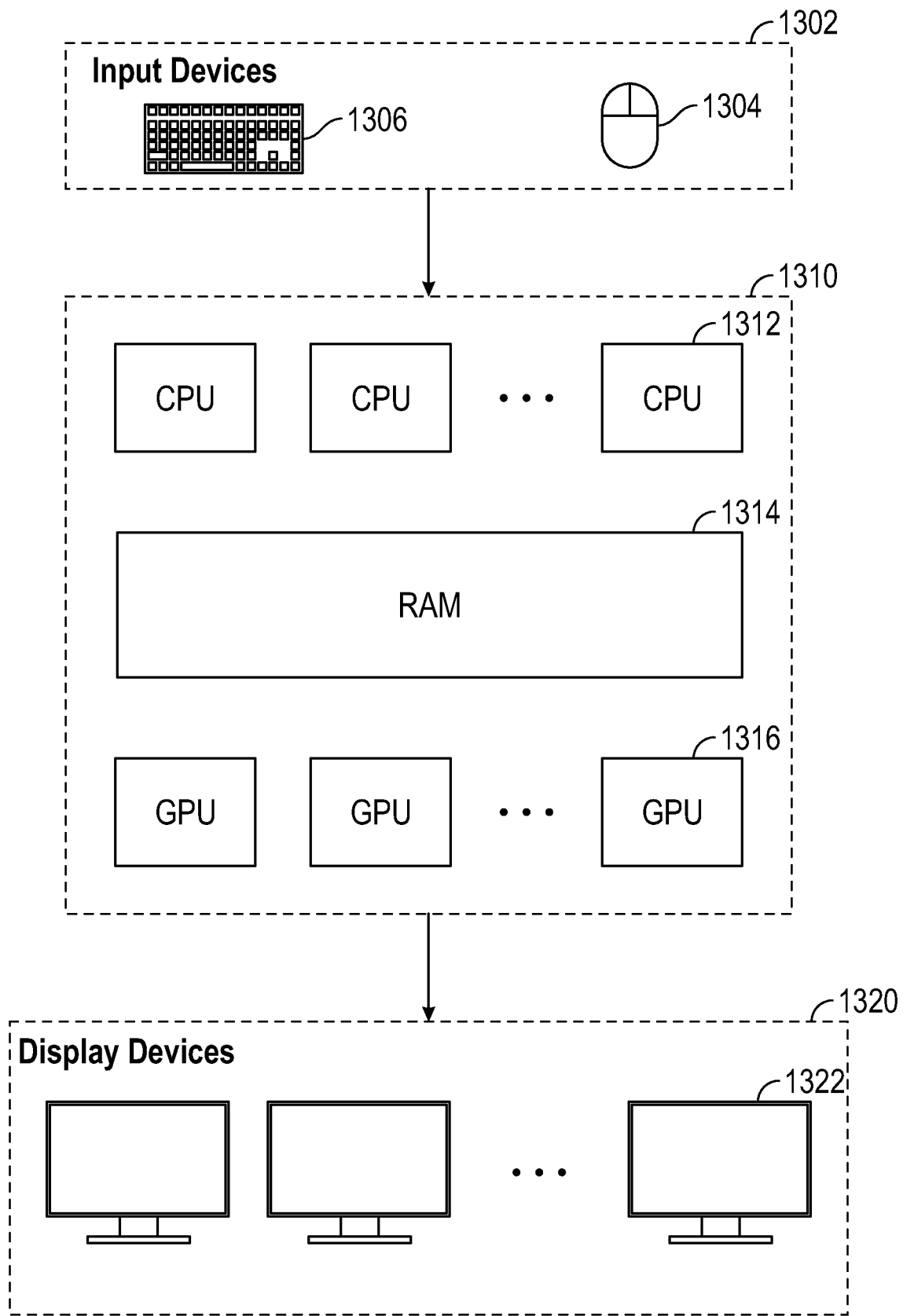
FIG. 13 is a block diagram illustrating one embodiment of a computer system suitable for use with the present disclosure.
Figure 15:
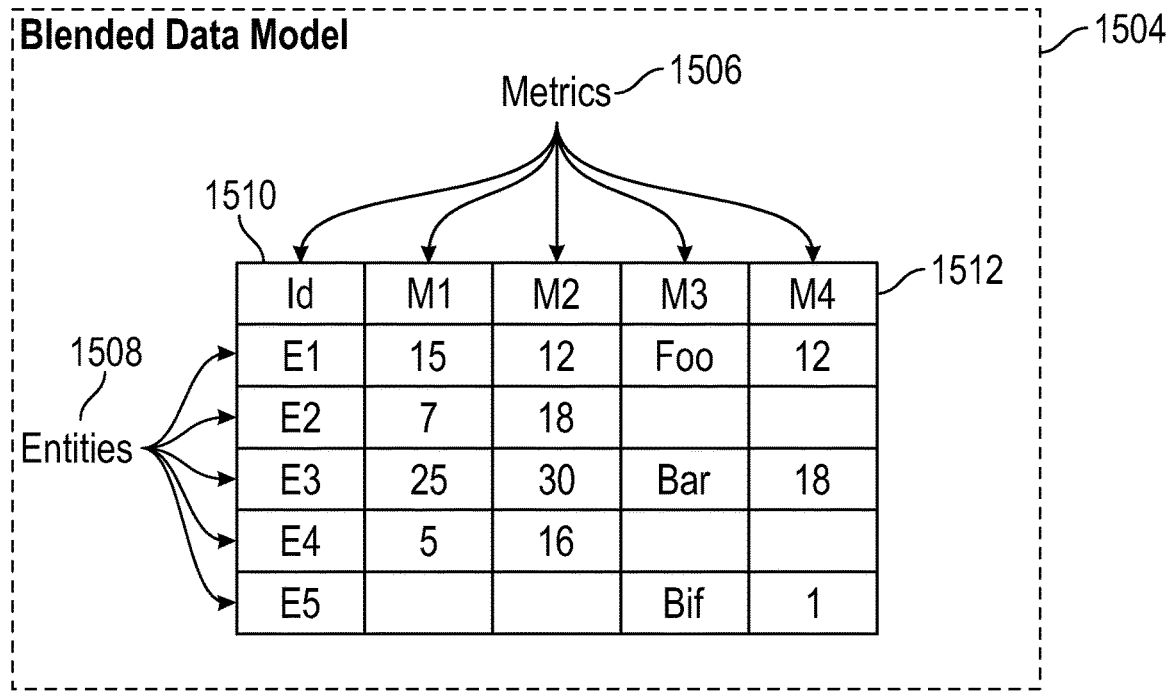
FIG. 15 is a block diagram illustrating an exemplary Blended Data Model with one Scope presented as a table of Entities and Metrics and transformed from exemplary Input Datasets.

The determination of the plurality of related input datasets may be made through a user interface described further in reference to FIG. 13. The determination of the plurality of related input datasets may alternatively be pre-determined through a configuration file. The term "related" indicates the Entity Id Column in one input dataset must relate to a Column in another input dataset. FIG. 15 provides one example: the three input datasets 1502 are related through the "Id" column. FIG. 16 provides another example: input dataset 1602 is related through the "PId" column to input dataset 1604 and the "PId" column. For another example, with biological data, one input dataset may have one row per distinct pair of gene and sample, another input dataset may have one row per gene, and another dataset may have one row per sample—thus, they are related through the identifiers for either the gene or the sample.

Figure 8A:
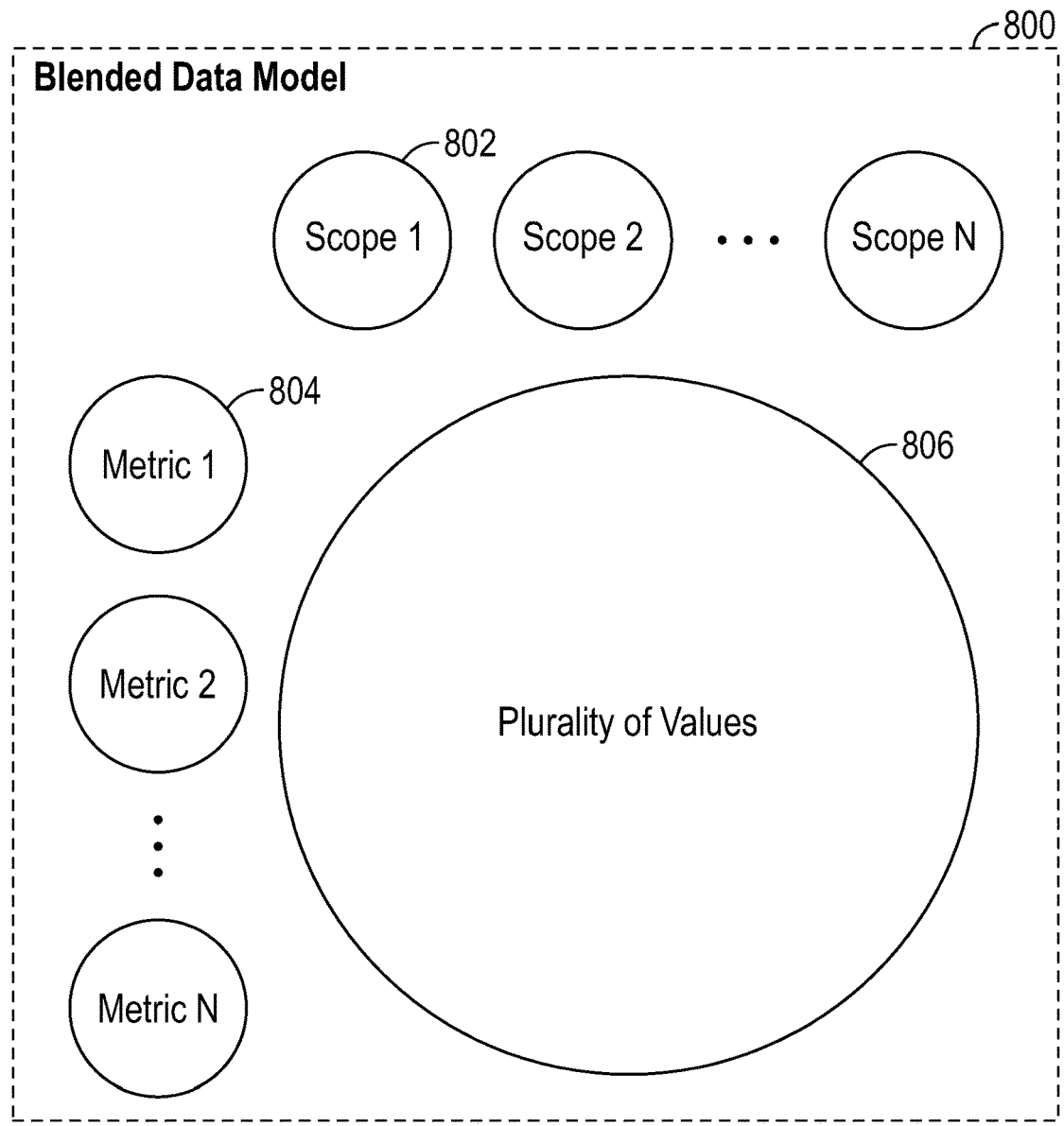
FIG. 8A is a block diagram illustrating one embodiment of the Blended Data Model comprised of a plurality of Scopes, a plurality of Metrics, and a plurality of Values.
Figure 8B:
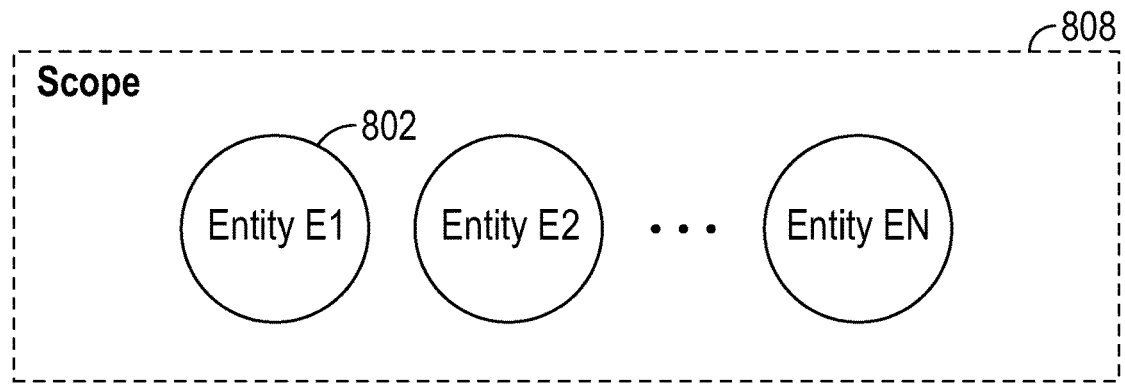
FIG. 8B is a block diagram illustrating one embodiment of a Scope comprised of a plurality of Entities.

In step 104, the plurality of input datasets is transformed to a Blended Data Model (BDM). This step is described further in reference to FIG. 2. FIG. 8 illustrates one embodiment of a BDM and a Scope. The BDM 800 is comprised of a plurality of Scopes 802, a plurality of Metrics 804, and a plurality of Values 806. Each distinct combination of a Scope and Metric further defines a subset plurality of Values 810. A Scope 808 is comprised of a plurality of Entities. An Entity is analogous to a data record and may be represented as a graphical element. A Metric is analogous to a column and may be represented as a graphical attribute of graphical elements. Values are atomic data (such as numbers and strings), and there is exactly one Value per pair of Metric and Entity, contained in the matching subset plurality of Values 810. Values are generally taken from the input datasets (the subset plurality of Values 810 are analogous to the values from a single column).

In step 106, the method 100 determines whether to manipulate the BDM from step 104 based on a user decision through the user interface. If the user chooses to manipulate the BDM, then the method 100 proceeds to step 108. Otherwise, the method 100 proceeds to step 110.

In step 108, the user manipulates the BDM using the user interface. This step is described further in reference to FIG. 4.

In step 110, the user selects a Data View from the BDM in step 104 or step 108 through the user interface. This step is described further in reference to FIG. 5. The Data View is comprised of a plurality of Entities and a plurality of Metrics.

In step 112, the Data View selected in step 110 is transformed to a 3D landscape visualization on a display device, which is described further in reference to FIG. 13. This step is further described in reference to FIG. 6. The 3D landscape visualization is comprised of graphical elements and graphical attributes.

In step 114, the user interacts with the 3D landscape visualization displayed in step 112 using the user interface and the display device to make observations and identification of visual patterns. This step is further described in reference to FIG. 7.

In step 116, the method 100 determines whether to formulate a new question based on a user decision through the user interface. If the user formulates a new question, then the method 100 returns to step 106. Otherwise, the method 100 ends.

Figure 2:
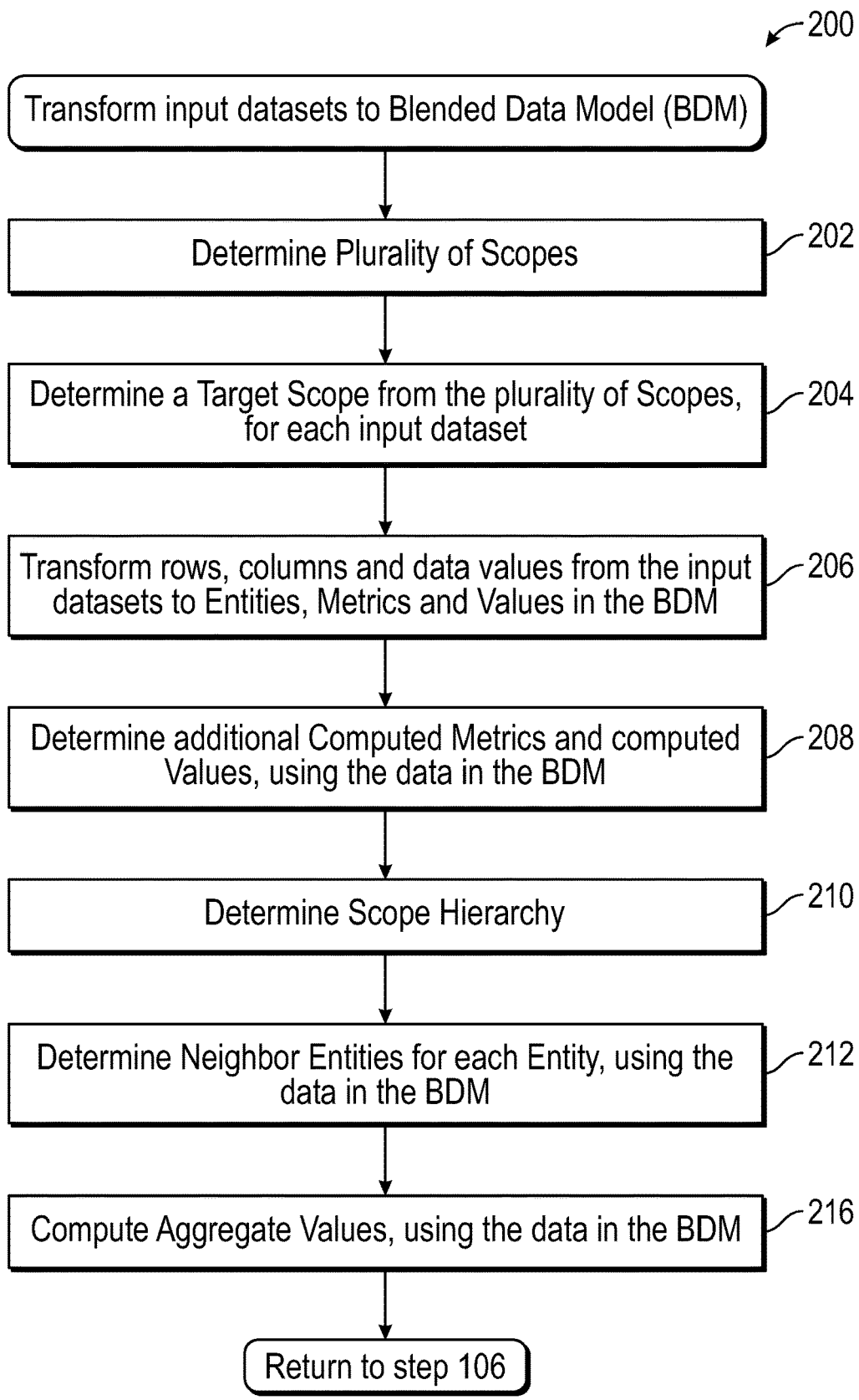
FIG. 2 is a flow diagram illustrating one embodiment of a method for performing step 104 in FIG. 1.

Referring now to FIG. 2, a flow diagram illustrates one embodiment of a method 200 for transforming the plurality of input datasets in step 104 of FIG. 1 to the BDM.

In step 202, a plurality of Scopes is determined. The determination of the plurality of Scopes may be made through the user interface or a configuration file.

Figure 9:
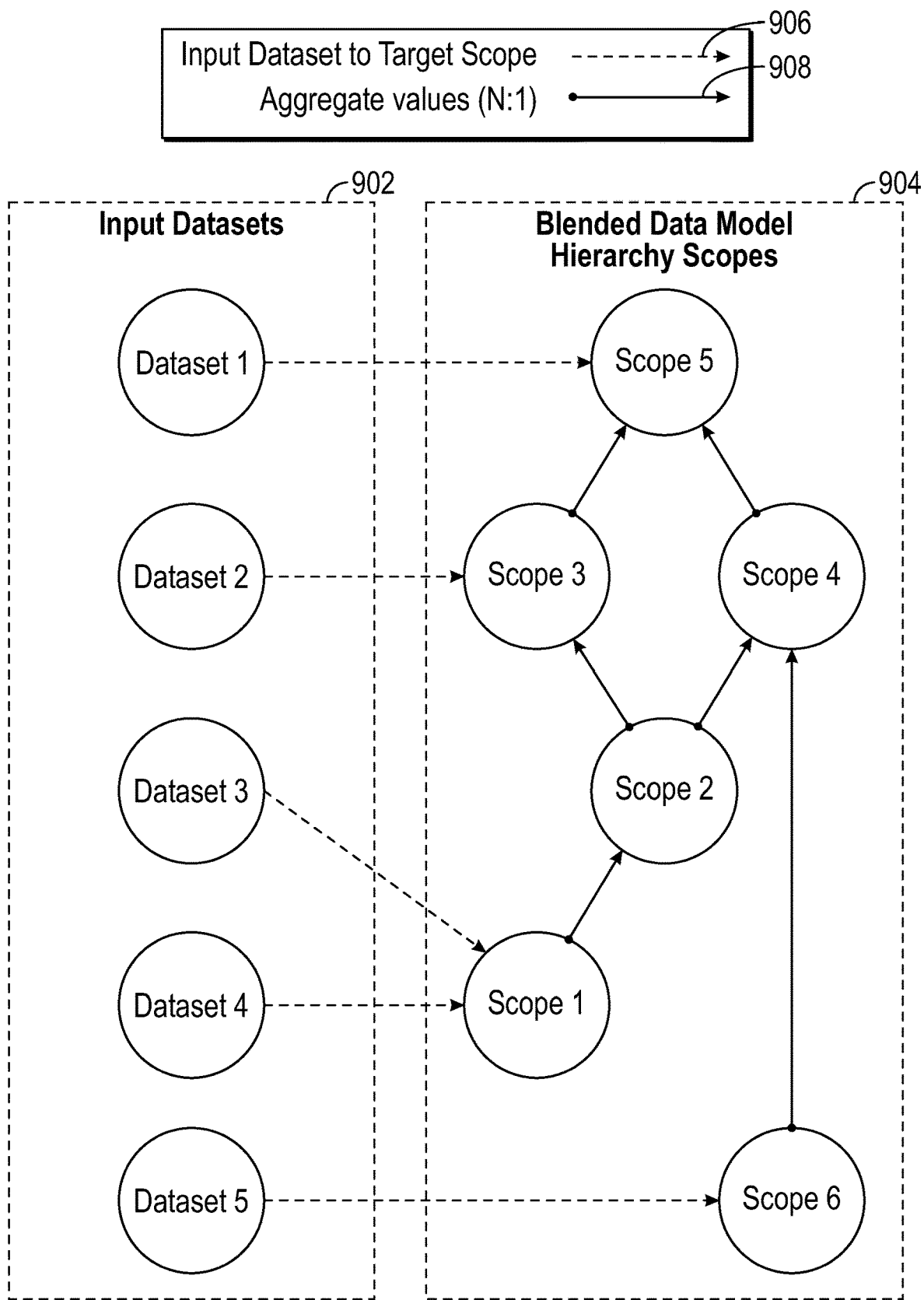
FIG. 9 is a block diagram illustrating an exemplary relationship between input datasets and Scopes, and between Scopes.

In step 204, each input dataset is mapped to (associated with) a Target Scope, which is determined from one of the plurality of Scopes from step 202. Multiple input datasets may share the same Target Scope. The determination of the Target Scope may be made through the user interface or a configuration file. In FIG. 9, an exemplary mapping from input datasets to Target Scopes is illustrated. For example, FIG. 9 demonstrates a plurality of input datasets 902, a plurality of Scopes 904, and each arrow 906 demonstrates the mapping from an input dataset to a Target Scope ("Dataset 3" and "Dataset 4" are both mapped to "Scope 1").

In step 206, the rows, columns and Data Values from the input datasets are transformed to Entities, Metrics and Values in the BDM. In FIG. 15, an exemplary BDM 1504 using a table, comprised of one Scope (further comprised of a plurality of Entities 1508), a plurality of Metrics 1506 and a plurality of Values is illustrated. Row 1512 demonstrates the Metric identifiers (Metric Id), which are unique to each Metric in the BDM 1504. Column 1510 demonstrates the Entity identifiers (Entity Id), which are also represented by a Metric with Metric Id of "Id", and unique to each Entity in the Scope.

The plurality of Metrics may be determined by transforming columns to Metrics for each dataset. The Metric Id is determined by the column name. For example, in FIG. 15, the columns from input datasets ("Id'", "M1", "M2", ... ) 1502 are mapped to Metrics 1506 ("Id", "M1", "M2", ... ) in the BDM 1504. In this manner, multiple input dataset columns may be associated with the same Metric when they share the same column name. A Merged Metric is a Metric where it contains values from multiple input datasets. In FIG. 15, "Id", "M1", and "M2" are Merged Metrics, as they are transformed from two input datasets.

For each Scope, the plurality of Entities may be determined by transforming rows to Entities from each input dataset with the mapping Target Scope 906. In this manner, each Entity is associated with an Owner Scope. Each Entity is identified by an Entity Id 1510. The Entity Id is determined by reading the value of the Entity Id Column from the input dataset. For example, in FIG. 15, the Entity Ids include "E1" and "E2". For another example, with biological data, the Entity Id might be a composite of a Gene name and Sample name such as "GEX.Sample5", which is a composite of "GEX" and "Sample5". A Merged Entity is an Entity mapped from multiple input datasets. For example, in FIG. 15, Entity "E1" is mapped from multiple input datasets 1502 to a single Entity in 1508.

The plurality of Values 806 may be determined by reading data values from the input dataset and storing each Value with the matching Entity (based on the input dataset row) and Metric (based on the input dataset column) in the BDM.

In step 208, a plurality of Computed Metrics is determined. The plurality of Computed Metrics may be determined through the user interface or a configuration file. A Computed Metric is a Metric where the Values are computed in the BDM using the Values of other Metrics. A Computed Metric is comprised of a formula, defining a function of a plurality of other Metrics (Dependent Metrics). For example, "M1=M2+M3" or "M4=Max(M6,M7)/M8". Values are computed by applying the function to the Values of the Dependent Metrics. Computed Metrics enable answering questions that cannot be directly answered using the Values derived from the input datasets. For example, the 3D landscape can map "the ratio of M1 to M2" to the graphical attribute of "Color" using a Computed Metric.

In step 210, a Scope Hierarchy is determined through the user interface or configuration file. The Scope Hierarchy 904 is used to determine Aggregate Values (defined below). In FIG. 9, an exemplary Scope Hierarchy 904 is illustrated. The Scope Hierarchy 904 is comprised of a plurality of Links 908. A Link is comprised of a pair of Scopes. In this manner, each Scope is associated with a plurality of Neighbor Scopes, which are all the Scopes with which it shares a Link. For example, in FIG. 9, "Scope 2" has three Neighbor Scopes: "Scope 1", "Scope 3", and "Scope 4". Generally, a Link 908 defines an N:1 relationship between Entities: multiple Entities (N) are related to the same Neighbor Entity (1).

A Chain is a series of connected Links, which determine a non-cyclic series of Scopes. The Primary Scope is the originating Scope in the Chain, and in this disclosure the Links are designated using "→". For example, in FIG. 9, for Primary Scope "Scope 2", one Chain is "Scope 2"→"Scope 4"→"Scope 6", and another is "Scope 2"→"Scope 1".

In this embodiment, there must be at most one Chain from each Scope to each other Scope. For example, in FIG. 9, there are two possible Chains from "Scope 2" to "Scope 5" ("Scope 2"→"Scope 3"→"Scope 5", and "Scope 2"→"Scope 4"→"Scope 5"). Similarly, in FIG. 9, there are two possible Chains from "Scope 2" to "Scope 4", and from "Scope 2" to "Scope 6". In one embodiment, a method for resolving the ambiguity is to select the Chain of the shortest path. For example, from "Scope 2" to "Scope 6", the Chain then is "Scope 2"→"Scope 4"→"Scope 6". In another embodiment, a Scope may be designated as an "End of Chain" through the user interface or configuration file. For example, if "Scope 3" is designated as an "End of Chain", then the Chain from "Scope 2" to "Scope 5" is "Scope 2"→"Scope 4"→"Scope 5".

Figure 10:
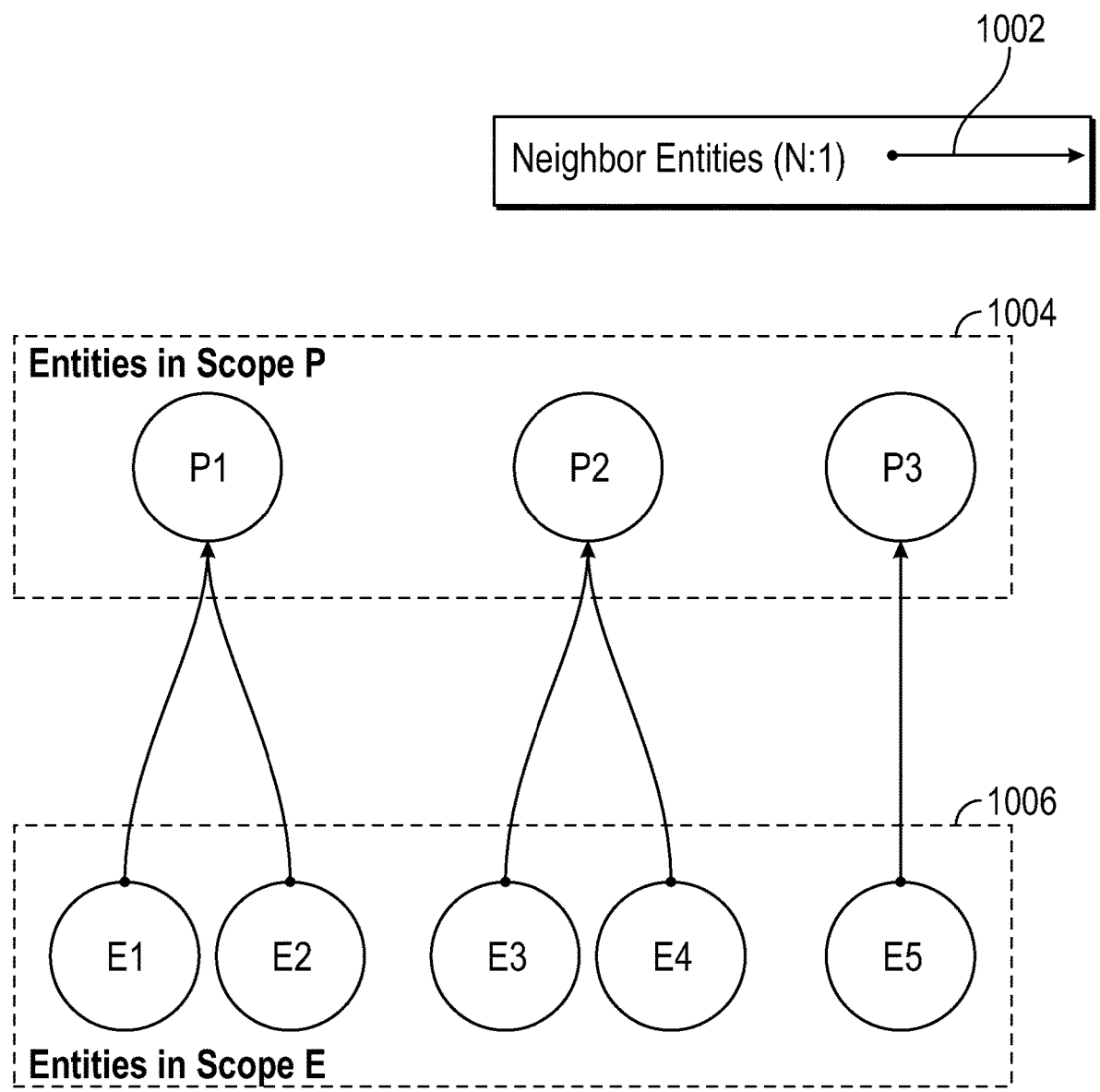
FIG. 10 is a block diagram illustrating an exemplary Neighbor Entity relationship between Entities contained in Neighbor Scopes.

In step 212, each Entity is associated with a plurality of Neighbor Entities using the data in the BDM and the Links 908. In FIG. 16, an exemplary mapping from input datasets 1602 and 1604 to a BDM 1606 is illustrated. The BDM 1606 is comprised of two Scopes, "Scope E" 1608 and "Scope P" 1610. As detailed above, each Entity is associated with an Owner Scope (step 206), and each Scope is associated with a plurality of Neighbor Scopes (step 210). Each Link to a Neighbor Scope is associated with a Scope Id Metric. For example, Metric 1612 is the Scope Id Metric for "Scope E" and Metric 1614 is the Scope Id Metric for "Scope P". The determination of the Scope Id Metric may be made through the user interface or a configuration file. For each Entity E with Owner Scope S1, it's plurality of Neighbor Entities in Neighbor Scope S2 are each Entity P of Scope S2 where the Value of the Scope Id Metric of S2 and Entity E is equal to the Entity Id of Entity P. For BDM 1606, FIG. 10 illustrates the matching Entity to Neighbor Entity relationships—Entities in "Scope E" 1006 are connected Entities in "Scope P" 1004 by indicators 1002.

Either Entity to Neighbor Entity relationship is symmetric. In FIG. 10, for example, Entity "E1" has a Neighbor Entity of "P1", and the plurality of Neighbor Entities of "P1" symmetrically includes "E1". For another example, with biological data, given Scope "Gene.Samples" with a Neighbor Scope of "Genes", Entity "GEX.Sample5" (in Scope "Gene.Samples") has a Neighbor Entity of "GEX" (in Scope "Genes"), and a Neighbor Entity of "Sample5" (in Scope "Samples").

An Implicit Neighbor Entity is an Entity where no matching Entity is directly transformed from the input datasets. For example, if Entity "E5" for Metric "PId" in Scope E 1608 had a Value of "P4", and no Entity "P4" is present in the input dataset 1604, then an Entity "P4" would be created in Neighbor Scope "P" 1610.

In step 216, Aggregate Values are computed for all combinations of Metric and Entity. In the BDM, the plurality of Values are comprised of Values originating directly from the input datasets 206, Values computed a Computed Metric's formula 208, and Aggregate Values 216. The method 200 then returns to step 106.

Figure 3A:
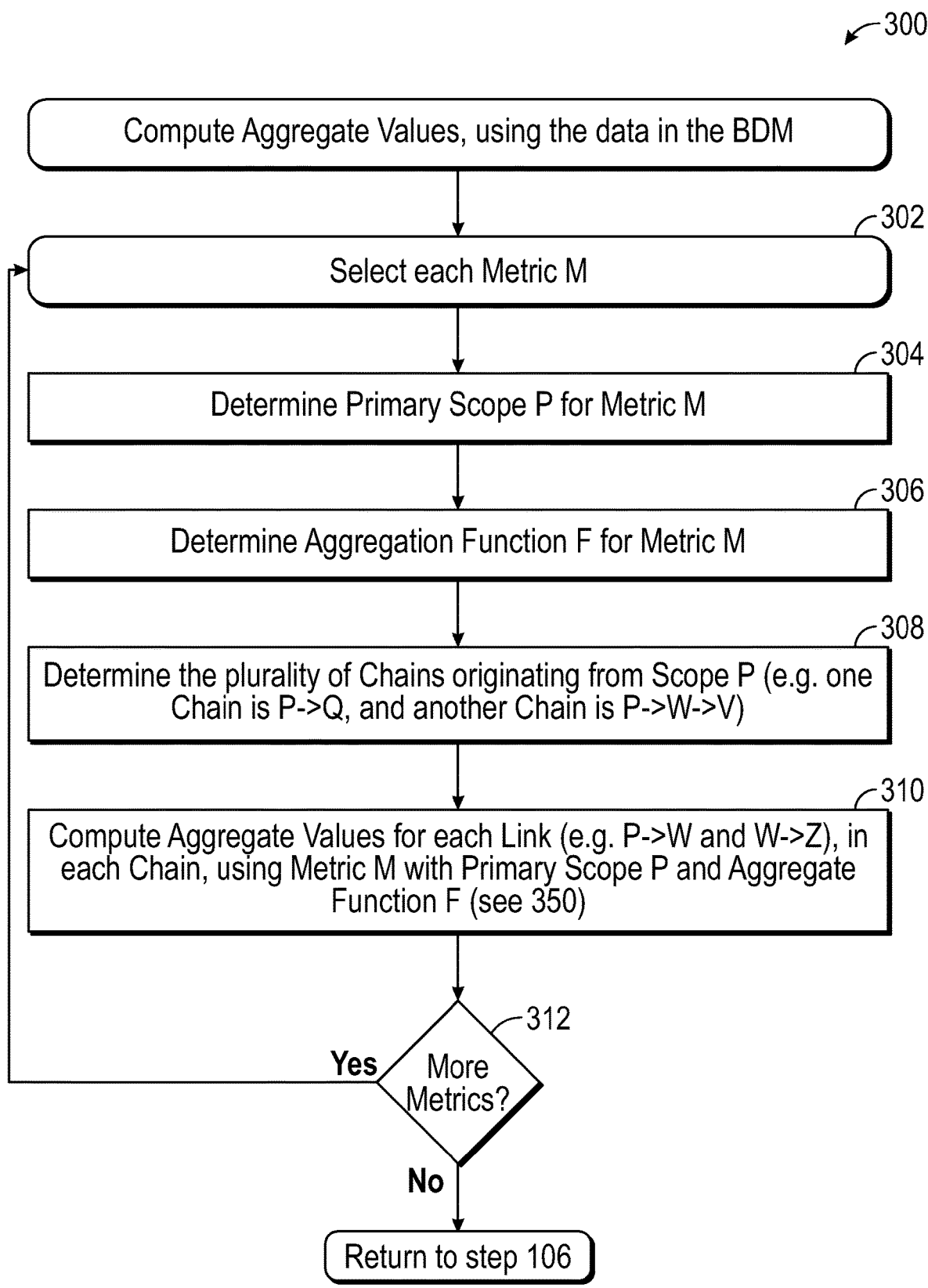
FIG. 3A is a flow diagram illustrating one embodiment of a method for performing step 216 in FIG. 2.

Referring now to FIG. 3A, a flow diagram illustrates one embodiment of a method 300 for computing Aggregate Values in step 216 of FIG. 2.

In step 302, each Metric M is selected in turn from the plurality of Metrics.

In step 304, a Primary Scope P is determined for the Metric M selected in step 302 from the plurality of Scopes in the BDM. For Metrics originating from an input dataset column 206, the Primary Scope is the Target Scope for the originating input dataset. For Computed Metrics 208, the Primary Scope may be determined through the user interface or a configuration file. Merged Metrics which originate from multiple input datasets that do not share a Target Scope Merged Metrics which originate from multiple input datasets that do not share a Target Scope have multiple Primary Scopes. When computing Aggregate Values in this case, each Chain uses the most appropriate Primary Scope depending on the final Scope in the Chain. In one embodiment, this determination of Primary Scope may be made using a selection intelligence, such as the shortest path to any Primary Scope. In another embodiment, the determination of Primary Scope may be made in the user interface or a configuration file. In this manner, for each Metric, Values for Entities in the Metric's Primary Scope are either directly mapped from the input data (step 206) or computed from the Computed Metric's formula (step 208). Values in other Scopes are computed as Aggregate Values.

In this manner, for each Metric, Values for Entities in the Metric's Primary Scope are either directly mapped from the input data (step 206) or computed from the Computed Metric's formula (step 208). Values in other Scopes are computed as Aggregate Values (step 216).

In step 306, an Aggregate Function F (such as sum, average, minimum, maximum) is determined for the Metric M selected in step 302. The Aggregate Function F may be determined through the user interface or a configuration file. The determination of the Aggregate Function F may also be made through selection intelligence, using the data type and data values for the matching input dataset columns.

In step 308, the plurality of Chains originating from Primary Scope P is determined per step 210. For example, given Scopes of "P", "Q", "W", "V", and Primary Scope "P", there are Chains "P"→"Q" and "P"→"W"→"V".

In step 310, Aggregate Values are computed for each Link in each Chain. In the previous example, there are three Links: "P"→"Q", "P"→"W" and "P"→"V".

In step 312, the method 300 determines if there are additional Metrics M to select and process. If there are additional Metrics M, then the method 300 returns to step 302. Otherwise, the method 300 returns to step 106.

Figure 3B:
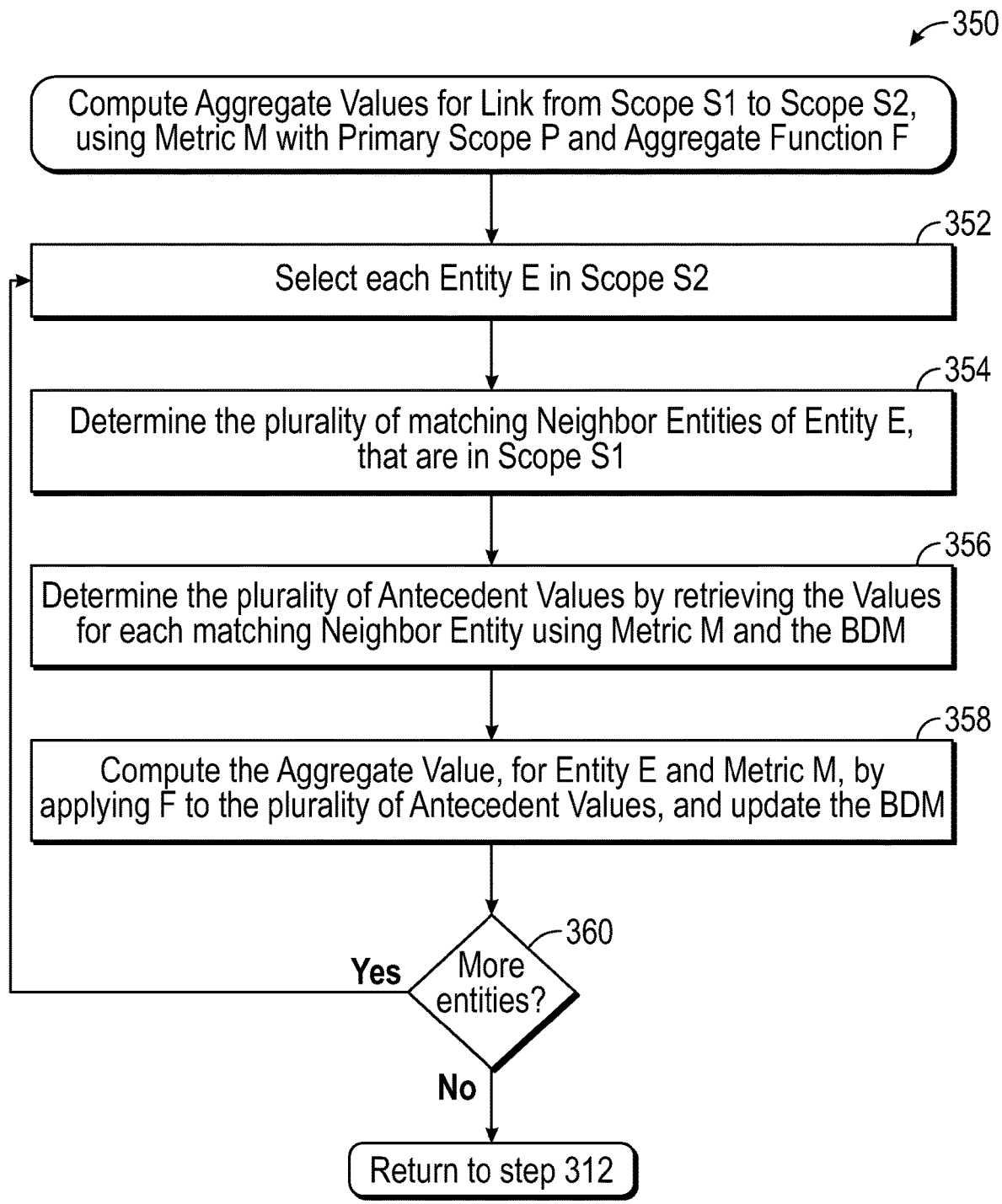
FIG. 3B is a flow diagram illustrating one embodiment of a method for performing step 310 in FIG. 3A.

Referring now to FIG. 3B, a flow diagram illustrates one embodiment of a method 350 for computing Aggregate Values for each Link in each Chain in step 310. The method 350 computes Aggregate Values given Metric M, Primary Scope P, Aggregate Function F, and a Link from Scopes S1 to S2.

In step 352, each Entity E is selected from the plurality of Entities in Scope S2.

In step 354, a plurality of matching Neighbor Entities of Entity E in Neighbor Scope S1 are determined as per step 212.

In step 356, a plurality of Antecedent Values is determined by retrieving the Values for each matching Neighbor Entity determined in step 354 using Metric M.

In step 358, an Aggregate Value is computed for Entity E and Metric M by applying Aggregate Function F to the plurality of Antecedent Values determined in step 356. These Aggregate Values are updated and stored in the BDM.

In FIG. 16, exemplary Aggregate Values based on input datasets are illustrated. The Aggregate Function for Metric "M2" is "Sum", so the Value of Metric "M2" for Entity "P2" in Scope P 1610 is "46", which is the sum of the Antecedent Values of Metric "M2" for Neighbor Entities "E3" and "E4" in Scope E 1608 ("30"+"16"). Scope P 1610 also demonstrates one method for aggregating non-numeric Antecedent Values, which may be defined with different types of Aggregate Functions. For Metric "M3" and Entity "P1", the Antecedent Values are "Foo" and "Foo", which are identical, so the Aggregate Value is "Foo". For Metric "M3" and Entity "P2", the Antecedent Values are "Bar", (no value) and "Cat", so the Aggregate Value is "(various)". In another implementation, the Aggregate Value in the latter case may be a composite, such as "Bar.Cat".

In step 360, the method 350 determines if there are additional Entities in Scope S2. If there are additional Entities, then the method 350 returns to step 352. Otherwise, the method 350 continues to step 362.

In step 362, the method 350 determines if there are additional Links for Metric M. If there are additional Links, then the method 350 repeats for the next Link. Otherwise, the method 350 returns to step 312.

Figure 4:
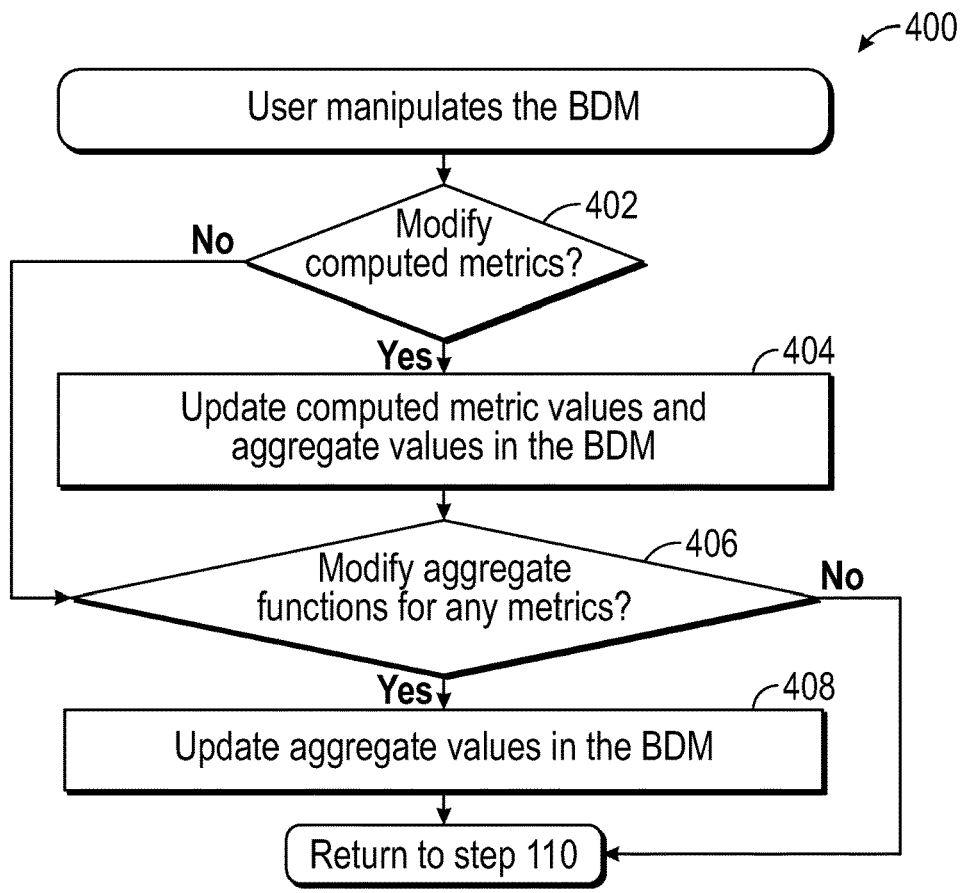
FIG. 4 is a flow diagram illustrating one embodiment of a method for performing step 108 in FIG. 1.

Referring now to FIG. 4, a flow diagram illustrates one embodiment of a method 400 for manipulating the BDM in step 108 of FIG. 1 using the user interface.

In step 402, the method 400 determines whether to modify the Computed Metrics using the user interface. If the user chooses to make a modification, then the Computed Metrics are modified using the user interface. These modifications include removing a Computed Metric, creating a new Computed Metric, or modifying a Computed Metric (such as modifying the formula or Primary Scope). The method 400 then proceeds to step 404. Otherwise, if no modifications are made, then the method 400 proceeds to step 406.

In step 404, Computed Metric Values are updated per step 208, and Aggregate Values are updated per step 216.

In step 406, the method 400 determines whether to modify the Aggregate Functions for any Metrics using the user interface. If the user chooses to make a modification, the Aggregate Functions are modified using the user interface, then the method 400 proceeds to step 408. Otherwise, the method 400 returns to step 110.

In step 408, Computed Metric Values are updated per step 208, Aggregate Values are updated per step 216, and the method 400 returns to step 110.

Figure 5:
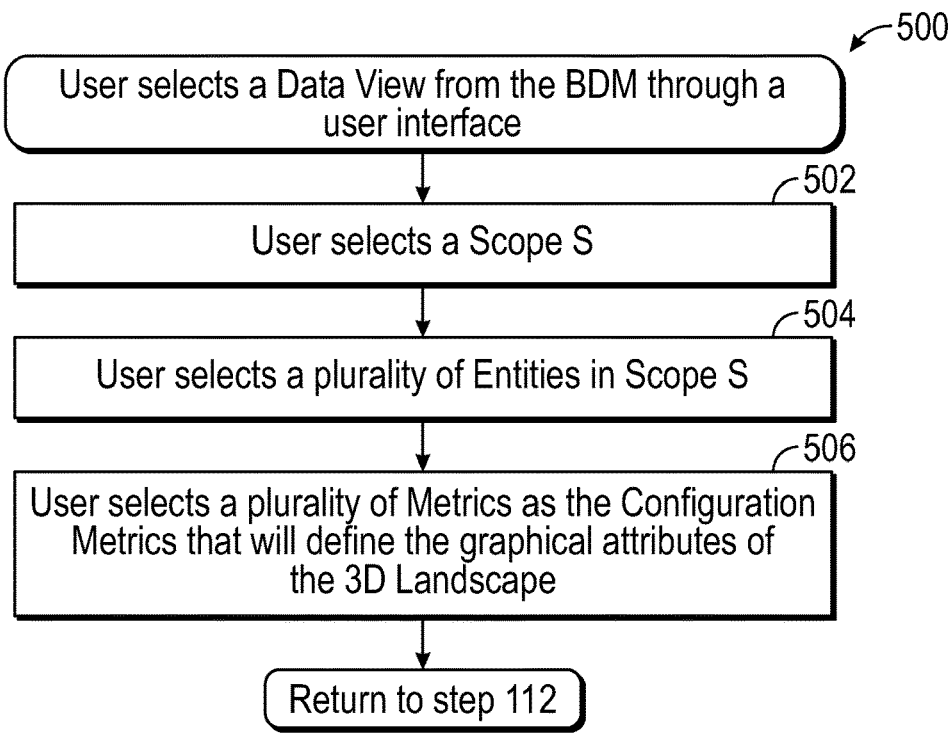
FIG. 5 is a flow diagram illustrating one embodiment of a method for performing step 110 in FIG. 1.

Referring now to FIG. 5, a flow diagram illustrates one embodiment of a method 500 for selecting a Data View from the BDM in step 110 of FIG. 1. The Data View is comprised of a Scope 5, a plurality of Entities in Scope S, and a plurality of Configuration Metrics.

In step 502, a Scope S is selected using the user interface.

In step 504, a plurality of Entities in Scope S is selected using the user interface. In one embodiment, Filters may be used, which are Computed Metrics where the formula resolves to a boolean value ("True" or "False"). For example, "Height>500 && Width<50" would restrict the plurality to only those Entities in Scope S where the Value of the Metric "Height" is greater than 500 and the Value of the "Width" Metric is less than 50.

In step 506, a plurality of Configuration Metrics is selected using the user interface by selecting a plurality of Metrics and associating each with a different graphical attribute used in the representation as a 3D landscape visualization. For example, in FIG. 11 per Legend 1102, the graphical attributes are Color, Size, Order and Group. The selection of the Configuration Metrics may also be made by selection intelligence, based on attributes of the Metrics or algorithmic analysis of the Values. For example, a Metric with numeric Values is selected for Size, and a Metric with non-numeric Values is selected for Color. The method 500 then returns to step 112.

Figure 6:
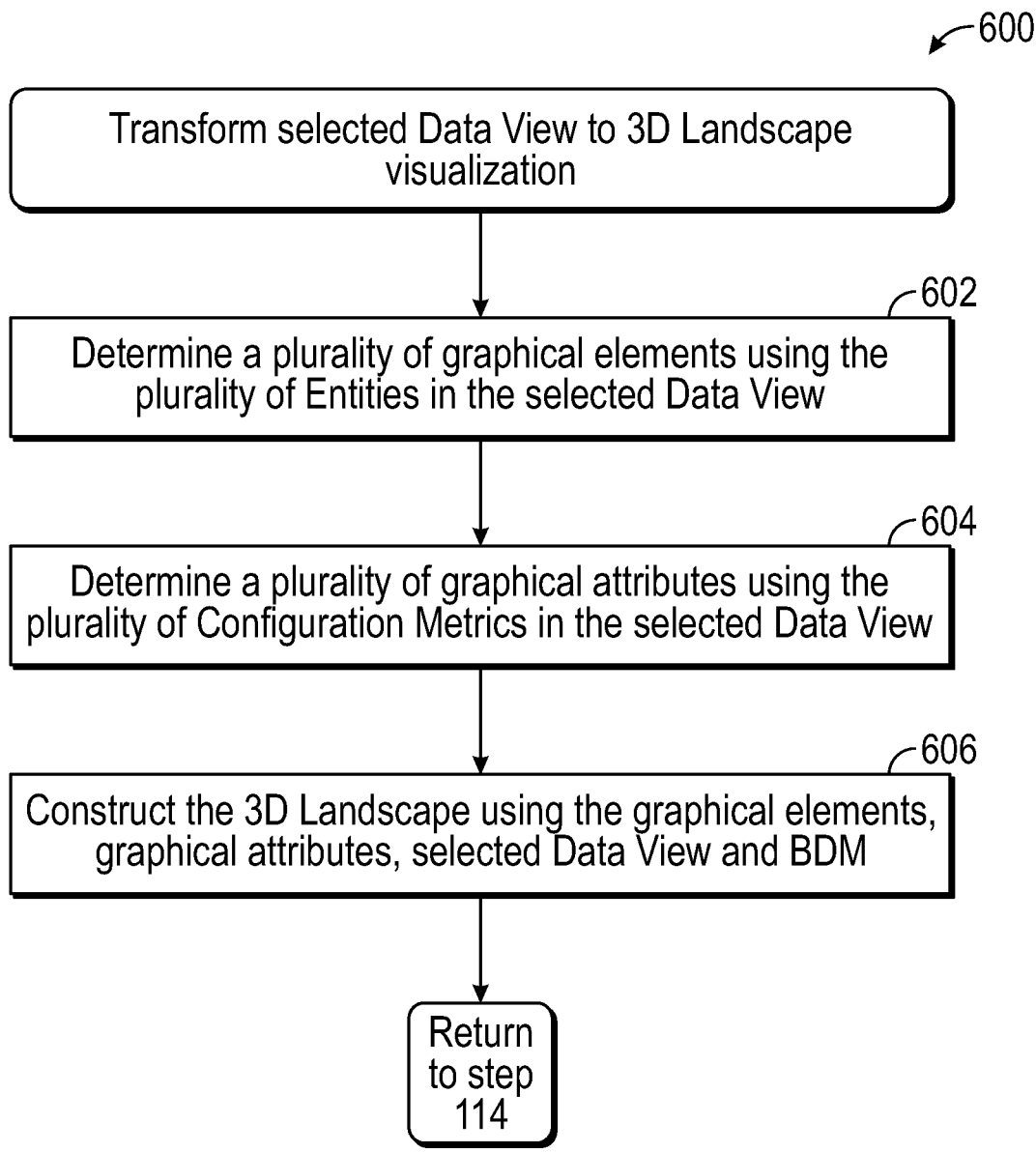
FIG. 6 is a flow diagram illustrating one embodiment of a method for performing step 112 in FIG. 1.
Figure 11:
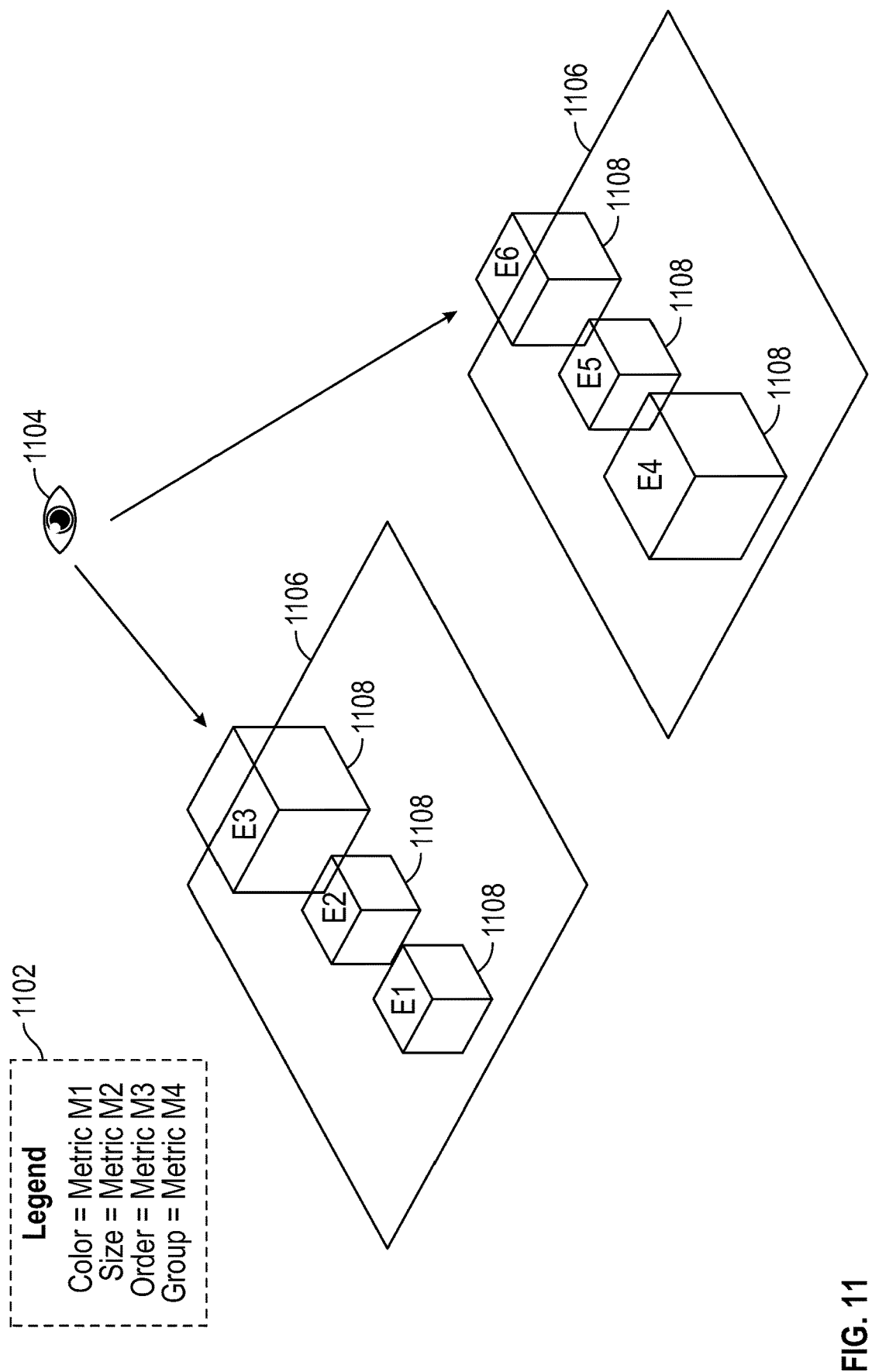
FIG. 11 is a block diagram illustrating an exemplary 3D landscape with several graphical elements, a mapping of Metrics to graphical attributes, and an eye representing the user.
Figure 12:
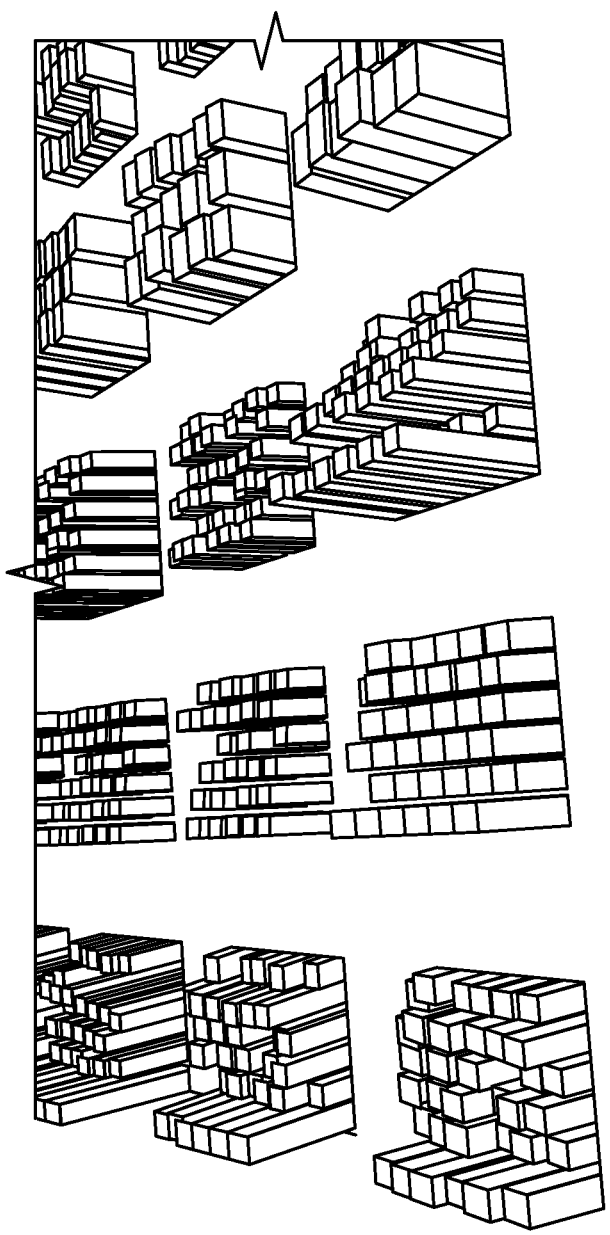
FIG. 12 is an exemplary display of a rendered 3D landscape.

Referring now to FIG. 6, a flow diagram illustrates one embodiment of a method 600 for transforming a selected Data View to a 3D landscape visualization in step 112 of FIG. 1. In FIG. 11, an exemplary 3D landscape and mapping of Entities to graphical elements and Configuration Metrics to graphical attributes is illustrated. And, FIG. 12 illustrates an exemplary rendered 3D landscape.

In step 602, a plurality of graphical elements is determined by creating one graphical element for each Entity in the plurality of Entities in the selected Data View. For example, graphical elements 1108 represent six Entities in the Data View.

In step 604, a plurality of graphical attributes is determined by mapping each Configuration Metric in the selected Data View to one or more graphical attribute available in the method 600. For example, "M1" is mapped to Color, "M2" is mapped to Size. "M3" is mapped to Order and "M4" to Group. The determination of the plurality of graphical attributes is limited by the method embodiment.

In step 606, a 3D landscape is constructed as 3D geometry by assigning the graphical attributes determined in step 604 to a respective graphical element determined in step 602 using the matching Value from the BDM for the matching Entity and Metric. The method 600 then returns to step 114. For example, if Height is assigned to "M1", and the Value for "E1" is 50 and the Value for "E3" is 100, then the graphical element for "E3" will be twice as large as the graphical element for "E1". In some embodiments, the mapping of Values to graphical attributes may also be defined as non-linear. For example, in a log 2-based scale, if the Value for "E1" is 50, then the Value for "E3" would need to be "200" for the graphical element to appear twice as large. The mapping of Values to graphical attributes may even have an inverse linear relationship. Configuration Metrics may be mapped to abstract attributes such as Order and Group, which are then mapped by an algorithm to explicit attributes such as X, Y and Z position.

In FIG. 11, Legend 1102 demonstrates a mapping from Configuration Metrics to graphical attributes, and there are six Entities mapped to graphical elements 1108. The size of each graphical element is mapped from Metric "M2". For example, "E3" and "E4" are the largest, so they have the largest Values for "M2". The graphical elements are assigned to two groups 1106 using Metric "M4", so Entities "E1", "E2", and "E3" have the same Value for Metric "M4". The graphical elements are ordered left to right using Metric "M3", so the Value for "E2" is larger than the Value for "E1". The user's eye 1104 observes this representation to identify visual patterns not obvious with other ways of viewing the data.

Figure 7:
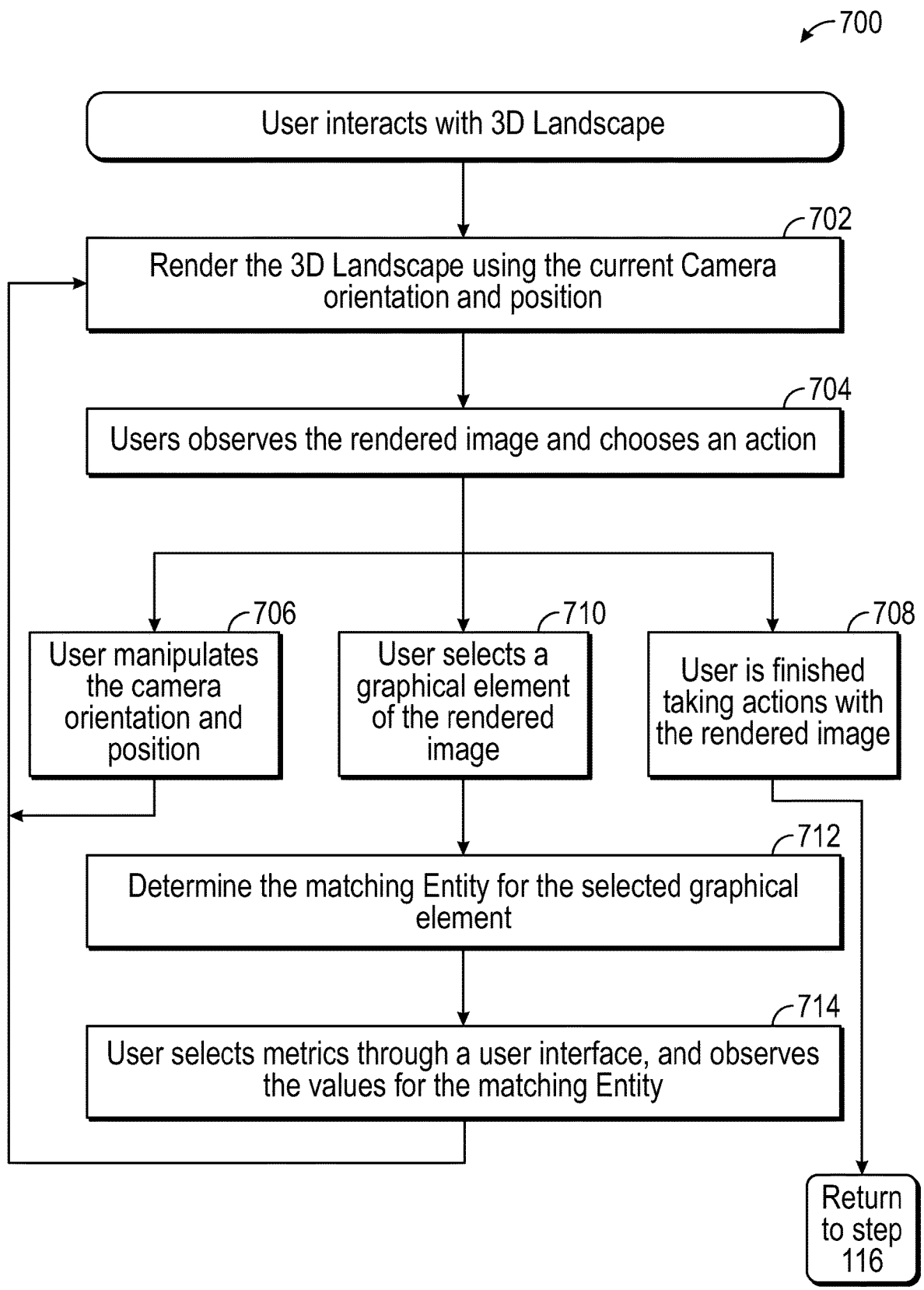
FIG. 7 is a flow diagram illustrating one embodiment of a method for performing step 114 in FIG. 1.

Referring now to FIG. 7, a flow diagram illustrates one embodiment of a method 700 for interacting with a 3D landscape visualization in step 114 of FIG. 1.

In step 702, a 3D landscape is rendered and displayed to the user, using a camera orientation and position (manipulated through step 706).

In step 704, the user observes the rendered image (as per 1104) and chooses an action from steps 706, 708, or 710. This observation may include patterns relevant to the user based on their expertise and knowledge.

In step 706, the user manipulates the camera orientation and position using the user interface and the method 700 returns to step 702 to update the rendering of the 3D landscape given the new camera orientation and position. This update is at a rate sufficiently fast that the user perceives an immediate or real-time change without perceptible delay or lag.

In step 708, the user has chosen not to continue inspecting the 3D landscape, and the method 700 returns to step 116.

In step 710, the user selects a graphical element of the rendered image using the user interface.

In step 712, a matching Entity for the graphical element selected in step 710 is determined using the Data View.

In step 714, the user selects a plurality of Metrics through the user interface and observes the Values for the matching Entity determined in step 712. The method 700 then returns to step 702. In one embodiment, if a selected Value is an Aggregate Value, the user interface may present the user with details on all direct or indirect Antecedent Values that comprise the Aggregate Value. In this manner, the user is able to inspect the original input data in detail, without any reduction of data typical of conventional solutions.

The methods disclosed herein may be implemented as a computer program running on computer hardware. The computer hardware may include a computer system 1310, and a user interface comprising input devices 1302, and display devices 1320. The input devices 1302 may include a keyboard 1306 and pointer device 1304 (such as a mouse, trackball, or touchscreen), for interacting with a user. The computer system 1310 comprises multiple CPUs 1312 for computing. The computer system 1310 further comprises RAM 1314 for storage of the computer program, the BDM, the Data View, the 3D landscape and any other relevant computer program state. The computer system 1310 further comprises one or more graphical processing units 1316 (GPU) for additional processing as well as rendering of the 3D landscape in real-time. The display devices 1320 comprise one or more devices for displaying the rendered images to a user on a computer monitor 1322. The input datasets may be stored on any storage device or be accessed over any network.

Although many other internal components of the computer system 1310 are not shown, those of ordinary skill in the art will appreciate that such components and their interconnection are well-known.

Immune Oncology Case Example

For an immune oncology application of the systems and methods described herein, multiple types of genomic datasets were blended from a population of samples with some additional data to interactively answer questions posed by an expert researcher. The data was generated in response to a proprietary treatment. This enabled the researcher to blend multiple disparate datasets derived from the same experiment into a single analysis and 3D landscape visualization that would previously have been analyzed independently. The researcher was able to validate or eject hypotheses formulated based on real-time response to their interrogation.

The input datasets included the following.

[GE] mRNA gene expression
Per Sample
  Per Gene
    Metric: "GeneExpressionValue"
    Metric: "Source"—fixed value of "GE"

[ID] InDel list of mutations to genetic DNA
Per Sample
  List of genomic positions (DNA base pairs)
    Metric: "Count"—fixed value of "1"
    Metric: "Mutation" description
    Metric: "Source"—fixed value of "ID"

[SNP] Single-nucleotide polymorphism (SNP) list of mutations to genetic DNA
Per Sample
  List of genomic positions
    Metric: "Count"—fixed value of "1"
    Metric: "Mutation" description
    Metric: "Source"—fixed value of "SNP"

[SM] Sample metadata
Per Sample
　Metric: "Group"—either "High", "Medium", or "Low" responder
[GR] Groups metadata
Per Group:
　Metric: "TotalCount"—number of Samples in this Group
[P] Genomic pathway data
Per Pathway
　List of genes
[G] Genomic position mapping data
Per Position
　Metric: "Gene"
A plurality of Scopes was defined as the following.
Annotation Scopes
Sources—GE, ID or SNP
Samples—one per Sample
Groups—High, Medium, Low
Genes—one per Gene
Positions—one per Position
Pathways—one per Pathway (e.g. "CytokineReceptorinteraction")
Scopes
Position.Sample.Sources—one per distinct genomic position, per Sample, per Source
Position.Group.Sources—one per distinct genomic position, per Group, per Source
Gene.Sample.Sources—one per Gene, per Sample, per Source
Gene.Group.Sources—one per Gene, per Group, per Source
Gene.Groups—one per Gene, per Group
Gene.Group.Source.Pathways—one per Gene, per Group, per Source, per Pathway
The Target Scopes for each input dataset were defined as the following.
　GE: to Gene.Sample.Sources
　ID: to Position.Sample.Sources
　SNP: to Position.Sample.Sources
　SM: to Samples
　GR: to Groups
　P: to Pathways
　G: to Positions
Computed Metrics defined in a configuration file included the following.
　PrimaryScope=Gene.Groups
　MutationCount=Sum(Count)
　MutationRatio=MutationCount/TotalCount
　PrimaryScope=Genes—the "[GroupName]
　FoldChange_GE=GeneExpressionValue[High]/GeneExpressionValue[Low]
　FoldChange_MUT=MutationRatio[High]/MutationRatio[Low]
Example user interaction included the following.
Select the Scope: Gene.Group.Sources
Select set of Configuration Metrics to visualize. E.g.
Height=GeneExpressionValue
Color=FoldChange_MUT
Interact with 3D landscape visualization
Select set of Entities that match certain criteria. E.g.
Select all "Genes" where:
FoldChange_GE>4 && FoldChangE_MUT>5
The resulting plurality of Genes defines a "Gene Signature" of interest to the user
Interact with 3D landscape visualization
Select the Gene.Group.Source.Pathways Scope
Select set of Configuration Metrics to visualize
Select set of Entities using the same Filter as above
The resulting plurality of Pathways define the set of Pathways that involve the selected Gene Signature
Interact with 3D landscape visualization As a result, the researcher was able to immediately detect patterns visually and identify mRNA expression and InDel/SNP mutations in minutes that would otherwise have taken months working with conventional data analysis methods. They were able to determine a gene signature (specific subsets of genes with mutations) that correlates to positive responses to the treatment, and, more importantly, a gene signature that correlates to non-responding samples. They were able to determine pathways related to the treatment that involved both expressed genes and genes with mutations.

While the present disclosure has been described in connection with forgoing embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for blending and aggregating multiple related datasets and rapidly generating a user-directed series of interactive three-dimensional landscape visualizations, comprising:
　a) transforming multiple related datasets into a blended data model (BDM) using a computer processor; the BDM comprising a plurality of Scopes, a plurality of Metrics and a plurality of Values, wherein each Scope includes a plurality of Entities, and wherein transforming the multiple datasets into the BDM comprises: determining a Target Scope from the plurality of Scopes for each dataset; transforming rows, columns and data values from the multiple datasets to the plurality of Entities, Metrics and Values; determining additional Computed Metrics and Computed Values; determining a Scope Hierarchy; determining Neighbor Entities for each Entity; determining Aggregate Functions for each Metric; and computing Aggregate Values for the plurality of Metrics using the Scope Hierarchy, the additional Computed Metrics, the plurality of Values, the additional Computed Values, the plurality of Entities and the Neighbor Entities;
　b) selecting a Data View from the BDM, wherein the Data View is comprised of one or more of the plurality of Entities and one or more of the plurality of Metrics; and
　c) transforming the Data View to the three-dimensional landscape visualization.

2. The method of claim 1, further comprising manipulating the BDM by at least one of the following:
　modifying one or more of the plurality of Metrics that are Computed Metrics, and modifying Aggregate Functions for one or more of the plurality of Metrics.

3. The method of claim 2, further comprising:
　interacting with the three-dimensional landscape visualization; formulating a new question based on a display of the three-dimensional landscape visualization; and repeating the following steps:
　manipulating the BDM by at least one of the following:
　　modifying one or more of the plurality of Metrics that are Computed Metrics, and modifying Aggregate Functions for one or more of the plurality of Metrics;
　selecting a Data View from the BDM, wherein the Data View is comprised of one or more of the plurality of Entities and one or more of the plurality of Metrics; and
　transforming the Data View to the three-dimensional landscape visualization.

4. The method of claim 1, wherein selecting the Data View from the BDM comprises:
   selecting a Scope from the plurality of Scopes;
   selecting a plurality of Entities from the selected Scope; and
   selecting one or more of the plurality of Metrics and associating each of the one or more of the plurality of Metrics with a different graphical attribute used in the three-dimensional landscape visualization to represent a respective Configuration Metric.

5. The method of claim 4, wherein transforming the Data View to the three-dimensional landscape visualization comprises:
   determining a plurality of graphical elements using the plurality of Entities in the selected Data View;
   determining a plurality of graphical attributes using each Configuration Metric in the selected Data View; and
   constructing the three-dimensional landscape visualization using the plurality of graphical elements, the plurality of graphical attributes and the selected Data View.

6. The method of claim 3, wherein interacting with the three-dimensional landscape visualization comprises:
   manipulating at least one of a camera orientation and camera position for the three-dimensional landscape visualization; and
   re-rendering the three-dimensional landscape visualization.

7. The method of claim 3, wherein interacting with the three-dimensional landscape visualization comprises:
   selecting a graphical element of the three-dimensional landscape visualization;
   determining a matching Entity for the selected graphical element using the Data View; and
   selecting one or more of the plurality of Metrics for observing each Value for the matching Entity.

8. The method of claim 7, further comprising re-rendering the three-dimensional landscape visualization and repeating the steps in claim 7.

9. The method of claim 1, wherein each dataset comprises a plurality of rows and columns with one data value for each respective row and column.

10. A non-transitory program carrier device tangibly carrying computer-executable instructions for blending and aggregating multiple related datasets and rapidly generating a user-directed series of interactive three-dimensional landscape visualizations, the instructions being executable to implement:
    a) transforming the multiple datasets into a blended data model (BDM) comprising a plurality of Scopes, a plurality of Metrics and a plurality of Values, wherein each Scope includes a plurality of Entities;
    b) manipulating the BDM by at least one of modifying one or more of the plurality of Metrics that are Computed Metrics; and modifying Aggregate Functions for one or more of the plurality of Metrics;
    c) selecting a Data View from the BDM, wherein the Data View includes one or more of the plurality of Entities and a one or more of the plurality of Metrics; and
    d) transforming the Data View to the three-dimensional landscape visualization;
    e) interacting with the three-dimensional landscape visualization;
    f) formulating a new question based on a display of the three-dimensional landscape visualization; and
    g) repeating steps b-d.

11. The program carrier device of claim 10, wherein transforming the multiple datasets into the BDM comprises:
    determining a Target Scope from the plurality of Scopes for each dataset;
    transforming rows, columns and data values from the multiple datasets to the plurality of Entities, Metrics and Values;
    determining additional Computed Metrics and Computed Values;
    determining a Scope Hierarchy;
    determining Neighbor Entities for each Entity; and
    determining Aggregate Functions for each Metric; and
    computing Aggregate Values for the plurality of Metrics using the Scope Hierarchy, the additional Computed Metrics, the plurality of Values, the additional Computed Values, the plurality of Entities and the Neighbor Entities.

12. The program carrier device of claim 10, wherein selecting the data view from the BDM comprises:
    selecting a Scope from the plurality of Scopes;
    selecting a plurality of Entities from the selected Scope; and
    selecting one or more of the plurality of Metrics and associating each of the one or more of the plurality of Metrics with a different graphical attribute used in the three-dimensional landscape visualization to represent a respective Configuration Metric.

13. The program carrier device of claim 12, wherein transforming the data view to the three-dimensional landscape visualization comprises:
    determining a plurality of graphical elements using the one or more of the plurality of Entities in the selected data view;
    determining a plurality of graphical attributes using each Configuration Metric in the selected Data View; and
    constructing the three-dimensional landscape visualization using the plurality of graphical elements, the plurality of graphical attributes and the selected Data View.

14. The program carrier device of claim 10, wherein interacting with the three-dimensional landscape visualization comprises:
    manipulating at least one of a camera orientation and camera position for the three-dimensional landscape visualization; and
    re-rendering the three-dimensional landscape visualization.

15. The program carrier device of claim 10, wherein interacting with the three-dimensional landscape visualization comprises:
    selecting a graphical element of the three-dimensional landscape visualization;
    determining a matching Entity for the selected graphical element using the Data View; and
    selecting one or more of the plurality of Metrics for observing each Value for the matching Entity.

16. The program carrier device of claim 15, further comprising re-rendering the three-dimensional landscape visualization and repeating the steps in claim 15.

17. The program carrier device of claim 10, wherein each dataset comprises a plurality of rows and columns with one data value for each respective row and column.

* * * * *